G. SLATTER.
GRASS CUTTER AND TRIMMER.
APPLICATION FILED DEC. 4, 1908.

1,054,320.

Patented Feb. 25, 1913.

3 SHEETS—SHEET 1.

G. SLATTER.
GRASS CUTTER AND TRIMMER.
APPLICATION FILED DEC. 4, 1908.

1,054,320.

Patented Feb. 25, 1913.

3 SHEETS—SHEET 2.

Witnesses:
L. C. Brady.
C. C. Wright.

Inventor
George Slatter
By J. S. Barker
atty.

G. SLATTER.
GRASS CUTTER AND TRIMMER.
APPLICATION FILED DEC. 4, 1908.

1,054,320.

Patented Feb. 25, 1913.

3 SHEETS—SHEET 3.

UNITED STATES PATENT OFFICE.

GEORGE SLATTER, OF PLUMTREE, ENGLAND.

GRASS CUTTER AND TRIMMER.

1,054,320.

Specification of Letters Patent.   Patented Feb. 25, 1913.

Application filed December 4, 1908.   Serial No. 466,003.

*To all whom it may concern:*

Be it known that I, GEORGE SLATTER, a subject of the King of Great Britain, and resident of Plumtree, in the county of Nottingham, England, have invented new and useful Improvements in Grass Cutters and Trimmers, of which the following is a specification.

This invention relates to improvements in mechanisms designed for the purpose of cutting and trimming the edges of lawns and which may be used as a separate machine or as part of an ordinary lawn mower; the object of the present invention being the production of a machine provided with means for cutting and trimming the edges of grass lawns which means may be raised and lowered for varying the depth of the cut and for moving such means out of and into work, also improvements in the general construction and arrangement of the machine and of the mechanisms used therein.

Figure 1:
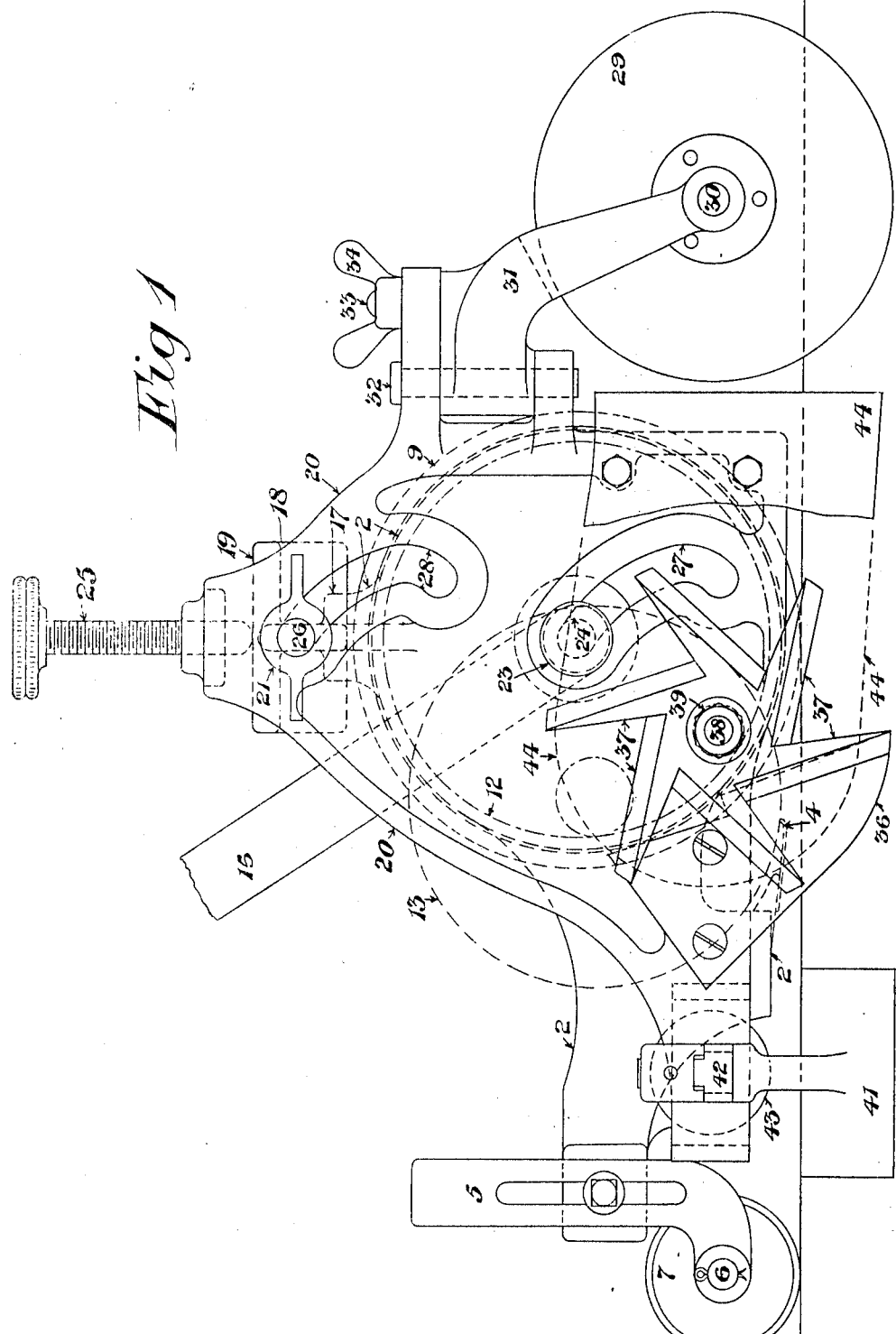
Figure 2:
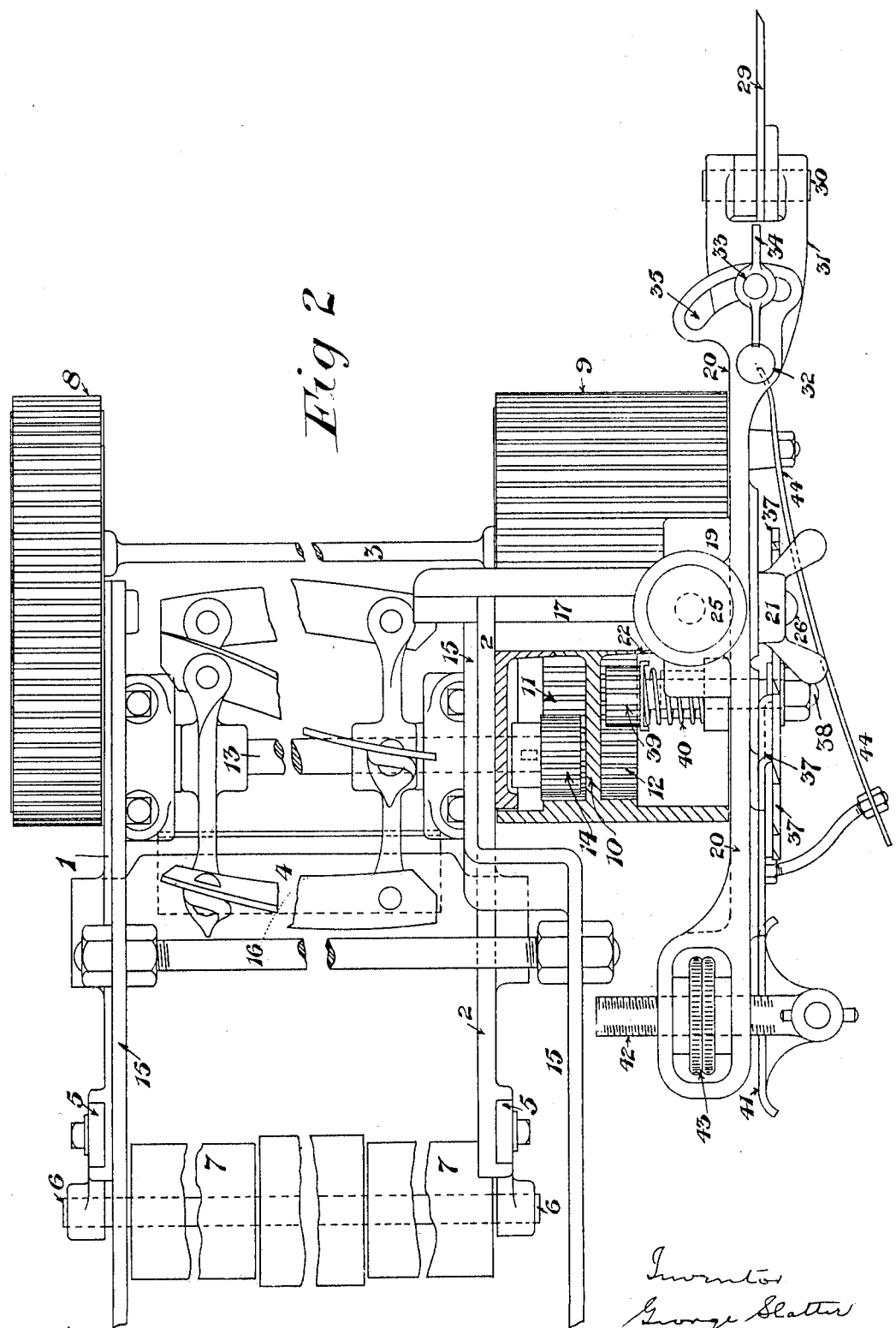
Figure 3:
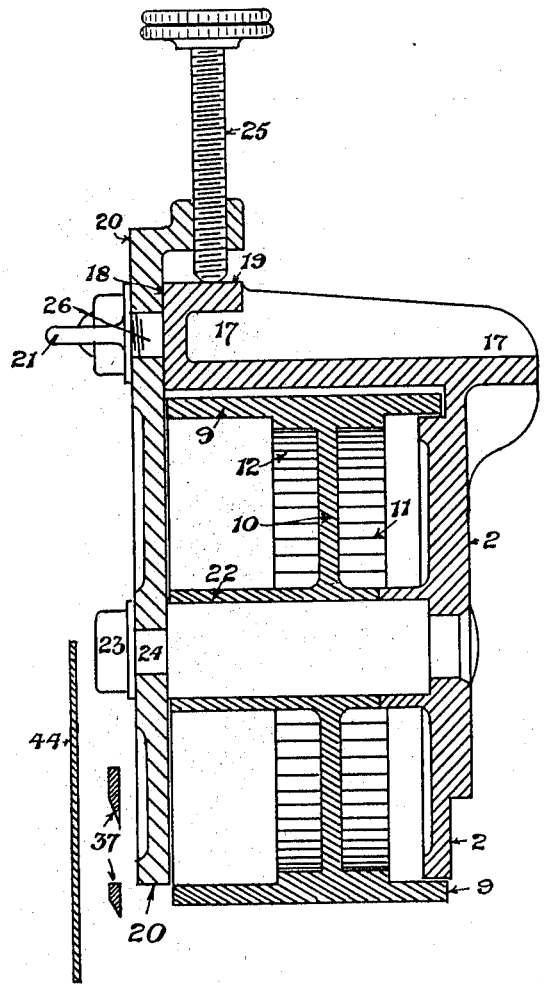

In the drawings:—Figure 1 is a side elevation of the improved grass cutter and trimmer. Fig. 2 is a plan of the same. Fig. 3 is a transverse section taken through the right hand driving wheel.

The machine selected to illustrate this invention is provided with side frames 1 and 2 which are connected together by a front tie rod 3 and at the back by the fixed lawn mower cutter 4. The back ends of the frames 1 and 2 carry adjustable bearings 5 for the axle 6 of the back roller 7 and at the front end of the frames there are fixed axles for the machine wheels or rollers 8 and 9. In the construction shown the wheel 9 is made with a dividing plate 10 and with internal toothed or gear sections 11 and 12, the gear 11 giving motion to the shaft 13 of the lawn mower knife through a pinion 14 and a clutch mechanism of the usual kind, and the other end of the knife shaft 13 being similarly driven from an internal toothed wheel in the inside of the wheel 8. The machine is also provided with handle bars 15 which are attached to the side frames 1 and 2 and connected together by a cross stay 16, and in connection with the handle bars there may be any of the usual means for holding them in any desired position.

The side frame 2 is extended upward at its front end and carries a T sectioned arm 17 which extends over the wheel 9 and at its front end is enlarged to form a facing 18 and a top bearing surface 19.

The mechanisms for cutting the sod at the edge of the lawn and for trimming the grass at the edge are carried by a side plate or frame 20 which is attached to the facing 18 by a thumb nut 21, and it is held vertical between the end of the axle on which the boss 22 of the wheel 9 revolves and the head 23 of a stud 24 attached to the end of such axle. The weight of the frame is carried by a screw 25 which rests on the top of the surface 19 and the frame 20 is provided with two cam shaped slots 27 and 28 which engage with the studs 24 and 26.

At the front end of the frame 20 there is a disk cutter 29 which is used for cutting the edge of the sod. This cutter is fitted to revolve on an axle 30 which has its bearings in a bracket 31, and this bracket is fitted to turn on a vertical axis 32 carried by the frame 20. The bracket 31 is also provided with a fixed stud 33 and winged nut 34 the stud working in a slot 35 formed in the end of the frame 20, and by this arrangement the cutter can be turned around the axis 32 and be fixed in any desired position for the purpose of working on the curved edge of the lawn. The frame 20 is also provided with a fixed blade 36, and working in conjunction with such blade there is a star wheel grass cutter 37. This cutter is mounted upon an axle 38 which has its bearing in the frame 20 and is fitted with a toothed pinion 39 by which the cutter 37 is driven from the gear section 12 for the purpose of cutting or trimming the grass at the edge of the lawn, the cutter 37 being held in cutting contact with the blade 36 by means of a spring 40.

At the back end of the frame 20 there is a guide 41 which is carried by a bolt 42 fitted to slide without turning in bearings in the frame 20 and provided with nuts 43 by which the position of the guide can be adjusted transversely and the guide be locked in such position. The machine is also provided with a guard plate 44 the shape of which is indicated in Fig. 1 by dotted lines. This guard is carried by studs from the frame 20 and is used for keeping the star wheel cutter 37 clear of the earth and sod cut from the edge of the lawn by the cutter 29.

When a machine of the kind herein described is to be used for cutting and trimming straight edges of lawns the parts are arranged as shown in the drawings, and when it is required to vary the depth of the cut, or the position of the parts relatively to the surface of the lawn, the thumb nut 21 is unscrewed and the frame 20 is raised by the screw 25, the cam slots 27 and 28 being so arranged that as the frame 20 is raised and lowered for adjustment the teeth of the pinion 39 remain in gear with the teeth of the gear section 12, but when the edge cutting and trimming mechanisms are to be thrown out of action then the frame is raised to its highest position and the lower parts of the slots 27 and 28 are so shaped as to carry the teeth of the pinion 39 clear of the teeth of the gear section 12, but when the machine is to be used for cutting and trimming curved edges of lawns, the cutter 29 is inclined relatively to the frame 20 and the position of the guide 41 is adjusted according to the particular curve to be operated upon.

The machine herein described may be used as a combined lawn mower, and lawn edge cutter and trimmer, or, the fixed and rotating lawn mower knives may be omitted and the wheels 8 and 9 be carried by the same axle and be sufficiently wide to support the machine when used for a lawn edge cutter and trimmer only.

Claims:

1. In a lawn edge trimmer, the combination of a main frame having a supporting and driving wheel, a vertically adjustable side frame supported by the main frame, a vertically disposed trimmer carried by the said adjustable side frame, driving gear for the trimmer driven from the said main supporting wheel, and means arranged to cause a disengagement of the gearing that drives the said trimmer when the side frame is adjusted to certain positions.

2. In a lawn edge trimmer, the combination of a main frame carrying a supporting and driving wheel, a vertically adjustable side frame formed with curved guide slots, a vertically disposed grass cutter carried by the side frame, means for driving the cutter, in gear with the said wheel of the main frame, guiding studs carried by the main frame and located in the said slots in the adjustable frame, the slots being so curved that proper mesh of the driving gear is maintained as the frame is adjusted, and means for securing the frame in the various vertical positions to which it may be adjusted.

3. In a lawn edge trimmer, the combination of a main frame carrying a supporting and driving wheel, a vertically adjustable side frame formed with curved guide slots, a vertically disposed grass cutter carried by the side frame, means for driving the cutter, in gear with the said wheel of the main frame, guiding studs carried by the main frame and located in the said slots in the adjustable frame, the slots being so curved throughout a portion of their extent that proper mesh of the driving gearing for the vertical cutter is maintained as the side frame is adjusted, and so curved throughout the balance of their extent that the gearing is thrown out of mesh when the frame is adjusted to certain positions, and means for maintaining the side frame in the positions to which it may be adjusted.

4. In a lawn edge trimmer, the combination of a main frame carrying a driving and supporting wheel, the said frame being formed with a top bearing, an adjustable side frame carried by the main frame, a vertically disposed grass cutter carried by the side frame, gearing for driving the said grass cutter, and an adjusting screw seated in the said side frame and resting on the said bearing of the main frame, by means of which the vertical position of the side frame is controlled.

5. In a lawn edge trimmer, the combination of a main frame having a supporting and driving wheel, a vertically disposed grass trimmer, a vertically disposed sod trimmer located in advance of the grass trimmer, the sod trimmer being adjustable about a vertical axis, and means for holding the sod trimmer fixed in the position to which it may be adjusted.

6. In a lawn edge trimmer, the combination of a main supporting frame, a vertically disposed grass cutter, a sod trimmer located in advance of the grass cutter and adjustable about a vertical axis, means for holding the said sod cutter fixed in the inclined position to which it may be adjusted about the said vertical axis, a guide in rear of the grass cutter for engaging with the trimmed edge of the lawn, and means for laterally adjusting and holding in fixed position the said guide.

GEORGE SLATTER.

Witnesses:
WILLIAM H. POTTER,
HARRY ROPER.